Nov. 2, 1965    R. W. DIETLEIN    3,215,183
UNITIZED FASTENER
Filed March 11, 1963    2 Sheets-Sheet 1
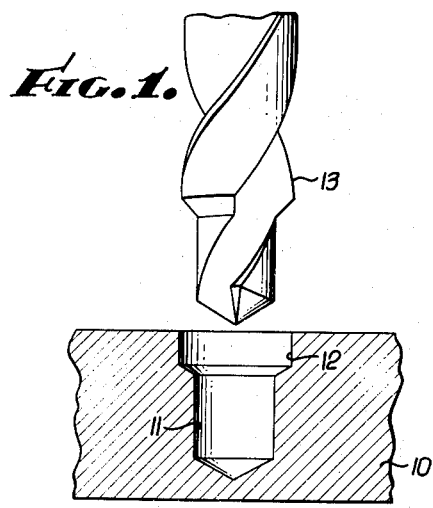
FIG. 1.
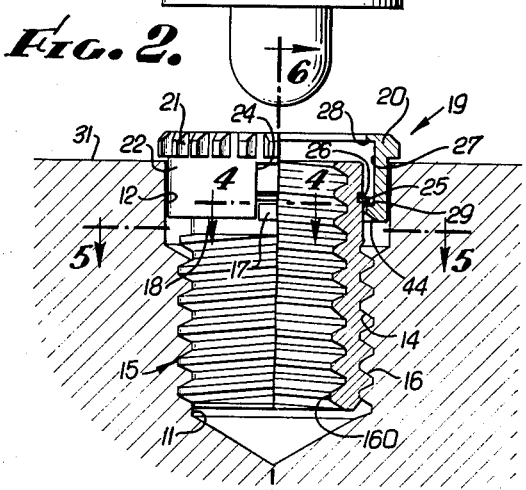
FIG. 2.
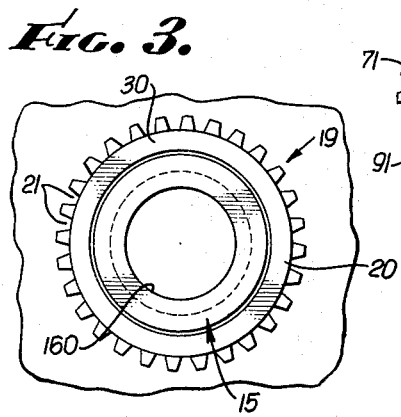
FIG. 3.
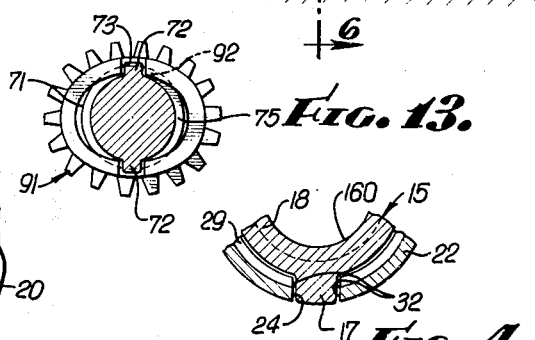
FIG. 13.
FIG. 4.
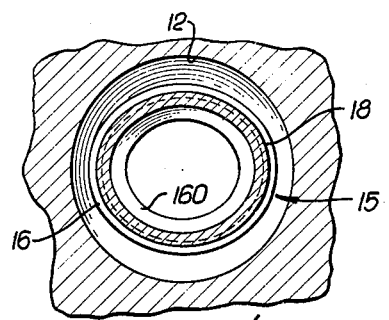
FIG. 5.
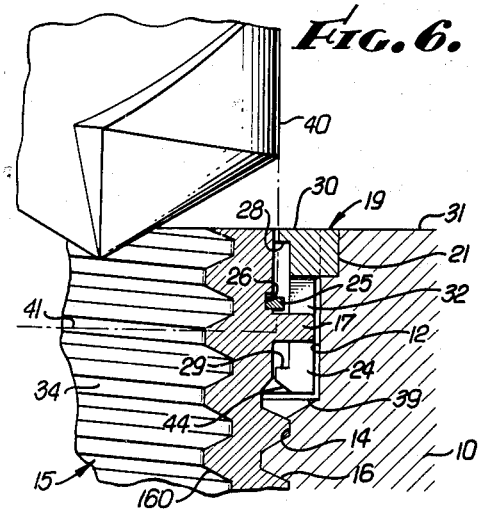
FIG. 6.
INVENTOR.
ROBERT W. DIETLEIN
BY
White & Haefliger
ATTORNEYS.

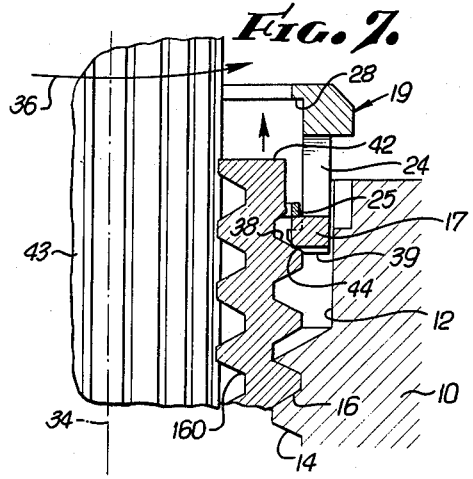
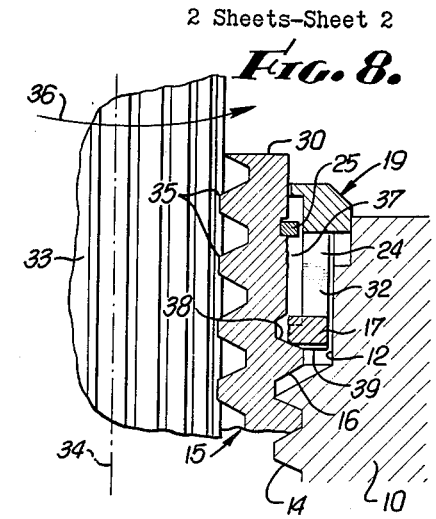
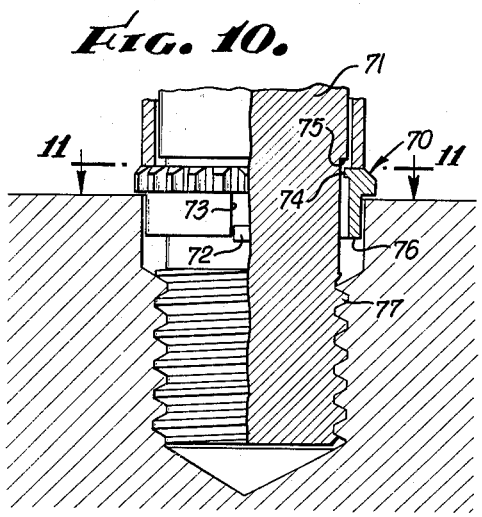
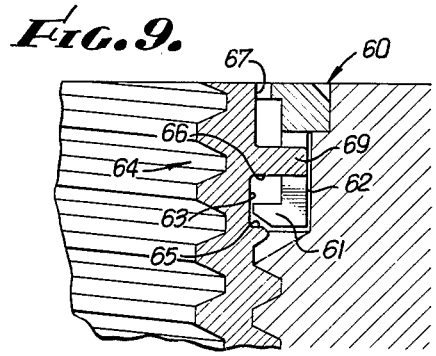
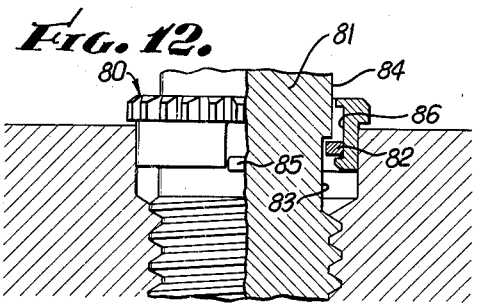
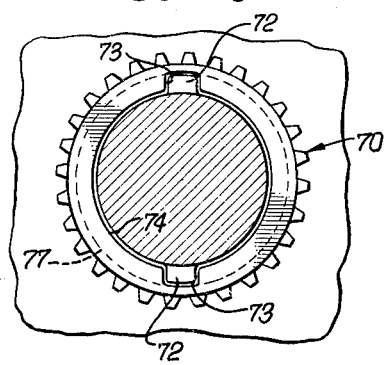

United States Patent Office

3,215,183
Patented Nov. 2, 1965

3,215,183
UNITIZED FASTENER
Robert W. Dietlein, La Crescenta, Calif., assignor to Components Engineering and Manufacturing Co., Inc., Los Angeles, Calif., a corporation of California
Filed Mar. 11, 1963, Ser. No. 264,401
7 Claims. (Cl. 151—41.73)

This invention relates generally to fastener devices, and more specifically concerns improvements in so-called ring-locked fasteners.

The improvements with which the invention is concerned are incorporated in that type of fastener which is attachable to a base or work member such as a panel, the fastener including a longitudinally forwardly extending shank connectible into a recess formed into the base or work and a holder received on the shank and connectible into the base during relative forward advancement of the holder along the shank and into the recess to seal the holder against rotation relative to the base.

The present invention improves substantially the construction and functioning of this type fastener in certain respects which will be brought out in detail herein. Some of the difficulties associated with previous ring-locked fasteners, and overcome by the present invention include the necessity for assembling locking rings on shanks during fastening operations, and the heretofore necessary operation of drilling out a portion of the fastener assembly in order to facilitate its removal from the work member when desired. Such drilling typically enlarges the recess in the work and makes necessary the use of a larger size fastener as a replacement for the removed fastener.

Toward overcoming the above-mentioned disadvantages, the present invention basically contemplates the provision in a fastener of a shank having forward structure including exterior threading to screw into work interior threading, a shear part integral with the shank, and a work gripping holder on the shank. The latter is characterized as subject to bodily advancement generally lengthwise of the shank to a work gripping position in which the holder blocks rotation of the shear part with the shank relative to the holder. Also, the shear part is sized for twisting of the shank by the holder upon unscrewing of the shank in a direction to back out of the work, and the forward structure on the shank is located to retract the holder and sheared part from the work in response to continued unscrewing of the shank. More specifically, the shank may be provided with shear lugs projecting outwardly from the main extent thereof and the holder may be in the form of a peripherally serrated ring having a skirt interfitting the lugs and blocking their rotation relative to the holder ring. With the lugs projecting from the shank at locations within a cylindrical locus defined by the tip diameter of the shank forward exterior threading, the lugs are then subject to retraction from the work by such threading after they have been sheared off the shank at said locations.

Other objects of the invention include the retention of the ring-shaped holder on the shank at all times so as to obviate the necessity for assembling the holder on the shank, and further to obviate the necessity for properly aligning the holder with the shear lugs to accommodate forward advancement of the holder relative to such lugs and into work gripping position. As will be brought out, the retention of the holder on the shank in the desired novel manner may be accomplished by the provision of an inwardly yieldable and deflectible split annulus mounted on the shank and received in a holder interior recess opening toward the shank, the retainer being located rearwardly of the shear lugs so as not to interfere with their function. Also, the holder may be retained loosely on the shank between the lugs and a shank enlargement over which the ring is assembled with interference to provide a fastener unit.

These and other objects and advantages of the invention, as well as the details of illustrative embodiments, will be more fully understood from the following detailed description of the drawings in which:

FIG. 1 is an enlarged vertical section taken through work or parent material into which a bored and counterbored recess has been sunk;

FIG. 2 is an enlarged vertical section taken through one form of the fastener just prior to forward advancement of the ring holder into gripping relation with the work;

FIG. 3 is a top plan view of the holder;

FIG. 4 is a fragmentary section taken on line 4—4 of FIG. 2;

FIG. 5 is a section taken on line 5—5 of FIG. 2;

FIG. 6 is an enlarged fragmentary vertical elevation taken through the shank and ring holder after forward advancement of the latter into gripping relation with the parent material;

FIG. 7 is a view like FIG. 6 illustrating the use of an easy-out tool to back the shank and holder along with the severed lugs out of the work;

FIG. 8 is a view like FIG. 7 showing a modified operation;

FIG. 9 is a view like FIG. 6 showing a modified manner of retaining the ring holder on the shank;

FIG. 10 is an enlarged vertical elevation taken in vertical section through a fastener wherein the shank projects rearwardly of the holder;

FIG. 11 is a top plan view of the holder of FIG. 10;

FIG. 12 is a view like FIG. 10 but showing a different manner of retaining the holder on the shank; and FIG. 13 is an underside view of a non-circular ring to be held on a shank.

Referring first to FIG. 1, the parent material is shown at 10 in the form of a panel or plate having a recess bored and counterbored therein at 11 and 12. A typical tool for accomplishing these operations is shown at 13. Following this step, the recess bore 11 is tapped by a suitable tool to form the thread illustrated at 14 in FIG. 2, in which condition the recess is ready to receive the fastener.

The latter includes a shank 15 having forward structure including exterior threading 16 to screw into work interior threading 14. As further shown in FIGS. 2 and 5 the shank may have interior threading at 160 which is cylindrical throughout the tubular shank excepting for a non-cylindrical zone better seen in FIG. 5 to have substantially elliptical cross section for interference engagement with a threaded member advanced into the shank interior thread, in holding relation therewith.

Integral with the shank 15 are two shear lugs 17 which project outwardly from the main unthreaded extent 18 thereof generally rearwardly of the forward threading 16 and from a location within the rearward extension of a cylindrical locus defined by the outermost tip diameter of the shank exterior threading 16, as seen for example in FIG. 6. Also, the lugs project from the surface of portion 18 at locations within the extension of a cylindrical locus defined by the outer tip diameter of the shank exterior thread 16. The lugs are characterized as being sized for twisting off the shank in the manner to be described and in a direction to back out of the work. Accordingly, after being twisted off the shank at the general location of their juncture therewith, the lugs may be lifted out of the recess when engaged or retracted by the exterior threading 16, as will be described in connection with FIGS. 7 and 8.

Finally, the fastener shown in FIG. 2 includes a work gripping holder 19 assembled on the shank, the holder being subject to bodily advancement generally lengthwise of the shank. Typically, the holder is in the form of peripherally serrated ring having a head 20 carrying the serrations 21, and a skirt 22 depending from the head. As is clear from FIG. 2, the skirt is sized for reception and advancement within the counterbore 12 at such time as the head is driven forwardly by a suitable tool 23 to drive the serrations 21 into the work and to work gripping position in which the holder blocks rotation of the lugs 17 and the shank 15. This blocking relationship is achieved by providing the holder with lengthwise extending recesses 24 for receiving the lugs 17, the recesses extending radially in the skirt to circularly interrupt the skirt. It will also be noted that the dimensions of the lugs in annular directions about the shank are slightly less than corresponding dimensions of the recesses into which they are received, and are substantially less than corresponding dimensions of the skirt between said recesses.

FIG. 2 shows the ring-shaped holder 19 to be axially retained on the shank in a rearward position, as by means of radially projecting means such as the inwardly yieldable and deflectible split annulus 25, which is mounted on the shank 15 as by reception in an interior recess or groove 26 formed in the shank. Also, the retainer 25 is received in a holder interior recess 27 which opens toward the shank and is bounded axially by shoulders 28 and 29. Accordingly, the holder is axially retained between the rearward and forward shoulders 28 and 29 which limit forward and rearward travel thereof.

Referring now to FIG. 6, the holder 19 is shown fully advanced into gripping relation with the work so that the top or rearward surface 30 thereof is flush with the surface 31 of the work. Under these conditions, the shank 15 is blocked against rearward unscrewing rotation from the work by engagement of the shank lugs 17 with the side walls 32 of the holder recesses 24, the holder being blocked against rotation by the gripping relationship of the serrations 21 with the work. Under these conditions, a suitable tool, such as a fluted easy-out 33 may be advanced forwardly and along the axis 34 to grip the inner peripheries of the internal thread 160, as at locations 35 in FIG. 8. Thereafter, the tool 33 may be turned, as for example in the direction of the arrow 36, to back the shank 15 from the work with sufficient torque to shear off the lugs 17 from the shank at the shear locations 37. This permits continued backing out of the shank by the tool 33, bringing the uppermost surface 38 of the thread 16 into retracting engagement with the severed lugs 17, and also into engagement with the forwardmost extent 39 of the holder skirt 22, thereby to retract the lugs and the holder from the work recess. It is noted at this point that only one operation is necessary to accomplish the complete retraction of all of the elements from the recess, obviating any necessity for drilling out the fastener as a preliminary step. Alternatively, the fastener may be drilled out as by the drill shown at 40 in FIG. 6 and to the typical depth 41 to disintegrate the shank extent above the plane 41 corresponding to the surface 42 of the cutaway shank seen in FIG. 7. Following such drilling, a removal tool 43 like easy-out 33 may be inserted and rotated to unscrew the shank from the work, during which the remainders of the lug 17 and the holder 19 are retracted. To facilitate shearing of the lugs, it is seen from the drawings that the combined cross sectional areas of the lugs at their roots is substantially less than the combined cross sectional areas of the serrations 21 at their roots, this relationship also being true in the other disclosed forms.

In all of FIGS. 2 and 6 through 8, the foremost portion 39 of the holder skirt 22 is shown as beveled at 44 for camming engagement with the C-shaped retainer 25 upon first assembly of the holder on the shank, such assembly causing the retainer 25 to pass the lowermost inwardly flanged portion of the skirt 22 and then snap back into the recess 27 betwen the shoulders 28 and 29.

FIG. 9 shows a modified form of the invention wherein the holder 60 has an inwardly flanged portion 61 at the forwardmost terminal of the holder skirt 62. Said flanged portion 61 is received within a recess 63 formed in the shank 64 and between shoulders 65 and 66. Furthermore, the flanged portion 61 may be assembled into the recess 63 after interference slippage over the outer surface 67 of the shank rearward and inward of the shank exterior thread 68, shank shoulder means 65 and 66 projecting radially to retain the holder flange 61 on the shank. The shear lugs are shown at 69 projecting outwardly from the shank and into the recesses formed by the skirt 62 of the holder.

FIGS. 10 and 11 show a modified form of the invention wherein the shank projects rearwardly of the ring 70 at 71. Accordingly, the enlargement 71 may be gripped and twisted to shear the lugs 72 off the shank in the manner described previously. The holder 70 has longitudinal recesses 73 receiving the lugs 72, and its general construction is the same as the holder of FIG. 2, excepting for the elimination of the skirt inwardly flanged portion shown in FIG. 2. The holder 70 is retained on the shank by interference of the holder rearward and inward flange 74 with radially projecting means such as the shank enlargement 71 at the location 75, and also by interference of the skirt forward terminus 76 with the shank exterior thread 77. The holder may be assembled on the shank by interference slippage over the shank enlargement 71, the flexibility of the flange 74 accommodating such assembly.

FIG. 12 shows another manner for retaining the holder 80 on the fastener shank 81 illustrated. In this embodiment, a C-shaped retainer 82 is received in the annular recess 83 in the shank between the enlargement 84 and the lugs 85 thereof. Retainer 82 in turn is received in the inward facing annular recess 86 of the holder 80, the construction of which is generally the same as described and shown in FIG. 2. Accordingly, the yieldable retainer 82 prevents disassembly of the holder 80 off the shank.

In FIG. 13 the shank may be like that shown in FIG. 10, with an enlargement 71 and an undercut shoulder 75. The holder ring 91 is generally like that shown at 70 in FIG. 10, but does not have a flange 74 and instead is formed to have a non-circular configuration so as to be retained on the shank by the undercut shoulder 75 as shown. The ring 91, which may be elliptical, is resiliently or yieldably deformed when assembled onto the shank as by frictional passage over and along the enlargement 71. After arrival at the undercut shoulder 75, the ring snaps back into the configuration shown with portions 92 thereof retained beneath the undercut shoulder 75.

I claim:

1. In a fastener, a shank having forward structure including exterior threading to screw into work interior threading, shear lugs integral with the shank and projecting outwardly from the main extent thereof generally rearwardly of said exterior threading and from locations within the rearward extension of a cylindrical locus defined by the outermost tip diameter of said shank exterior threading, a work gripping holder in the form of a ring extending about and retained on the shank rearwardly of said shank exterior threading, and radially projecting means carried on the shank to retain the holder thereon, the holder ring having a head with peripheral serrations and a skirt depending from said head inwardly of a generally cylindrical locus defined by the tips of the head serrations, the skirt having forwardly extending recesses receiving said lugs, the recesses extending radially in the skirt so as to circularly interrupt the skirt, said holder being subject to bodily advancement generally lengthwise of the shank to a forward work gripping position in which the holder skirt interfits said lugs and blocks rotation thereof with the shank relative to the holder, said lugs being sized for shear twisting off the shank by the holder skirt upon unscrewing of the shank in a direction to back out of the work, the combined cross sectional area of the lugs at their roots being substantially less than the combined cross sectional area of said peripheral serrations at their roots whereby the lugs will shear twist off the shank as described, the dimensions of said lugs in annular directions about the shank being less than corresponding dimensions of the recesses into which they are received and substantially less than corresponding dimensions of the skirt between said recesses, and said shank forward structure being located to retract said holder and sheared part from the work in response to continued unscrewing of the shank.

2. The invention as defined in claim 1 in which the holder is axially retained in said rearward position between forward and rearward shoulders.

3. The invention as defined in claim 1 in which said holder ring is loosely retained on the shank between said lugs and said radially projecting means in the form of a shank enlargement over which the ring is assembled with interference toward said rearward position.

4. The invention as defined in claim 1 in which said shank projects rearwardly of the rearwardmost position of the holder to be gripped and twisted for twisting said lugs off the shank.

5. In a fastener, a shank having forward structure including exterior threading to screw into work interior threading, a work gripping holder in the form of a ring extending about and retained on the shank rearwardly of the shank exterior threading, and radially projecting means carried on the shank to retain the holder thereon, the holder having a head with peripheral serrations and a body depending from the head to project inwardly of a generally cylindrical locus defined by the tips of the head serrations, and a blocking part carried to project generally radially and outwardly of said shank rearwardly of said exterior threading and from a location within the rearward extension of a generally cylindrical locus defined by the outermost boundary of the shank forward structure, said body having a forwardly extending recess receiving said part, the recess extending radially in said body so as to interrupt the body in a direction about the shank, said holder being subject to bodily advancement generally lengthwise of the shank to a forward work gripping position in which it combines with said part to block unscrewing rotation of said shank relative to the holder, said part being sized for shearing relative to the shank to unblock unscrewing rotation of the shank in response to application to said part of predetermined torque tending to overcome said blocking and to back said shank out of the work, the cross sectional area of said part being substantially less than the combined cross sectional area of said peripheral serrations at their roots whereby said part will shear as described, the dimension of said part in an annular direction about the shank being less than the corresponding dimension of said recess into which the part is received and substantially less than the dimension in an annular direction about the shank of a portion of said body adjacent said part, and said shank forward structure being located to retract said part and said holder from the work in response to continued unscrewing of the shank.

6. In a fastener, a shank having forward structure including exterior threading to screw into work interior threading, shear lugs integral with the shank and projecting outwardly from the main extent thereof generally rearwardly of said exterior threading and from locations within the rearward extension of a cylindrical locus defined by the outermost tip diameter of said shank exterior threading, a work gripping holder in the form of a ring extending about and retained on the shank rearwardly of said shank exterior threading, the holder ring having a head with peripheral serrations and a skirt depending from said head inwardly of a generally cylindrical locus defined by the tips of the head serrations, the skirt having forwardly extending recesses receiving said lugs, said holder being subject to bodily advancement generally lengthwise of the shank to a forward work gripping position in which the holder skirt interfits said lugs and blocks rotation thereof with the shank relative to the holder, said lugs being sized for twisting off the shank by the holder skirt upon unscrewing of the shank in a direction to back out of the work, the dimensions of said lugs in annular directions about the shank being substantially less than corresponding dimensions of the skirt between said recesses, said shank forward structure being located to retract said holder and sheared part from the work in response to continued unscrewing of the shank, and a retainer loosely retaining said holder in said rearward position while accommodating said holder advancement, said retainer comprising an inwardly yieldable deflectible split annulus mounted on the shank and received in a holder interior recess opening toward the shank.

7. The invention as defined in claim 6 in which a forward portion of the holder ring is beveled to cam the annulus inwardly as the ring is assembled forwardly over the shank and annulus toward said rearward position.

References Cited by the Examiner
UNITED STATES PATENTS

| | | | |
|---|---|---|---|
| 2,400,318 | 5/46 | Rosan | 151—41.73 |
| 2,550,867 | 5/51 | Rosan | 151—41.73 |
| 2,731,714 | 1/56 | Dudley | 29—427 |
| 2,788,830 | 4/57 | Rosan | 151—41.73 |
| 2,849,046 | 8/58 | Cummaro | 151—41.73 |
| 2,874,457 | 2/59 | Bennett | 29—427 |
| 2,886,090 | 5/59 | Rosan | 151—41.73 |
| 3,027,796 | 4/62 | Shewmon | 85—61 |

EDWARD C. ALLEN, *Primary Examiner.*